United States Patent [19]
Hickson

[11] 3,844,978
[45] Oct. 29, 1974

[54] LAYERED CLAY MINERALS AND PROCESSES FOR USING

[75] Inventor: Donald A. Hickson, Richmond, Calif.

[73] Assignee: Chevron Research Company, San Francisco, Calif.

[22] Filed: Dec. 1, 1972

[21] Appl. No.: 311,080

[52] U.S. Cl............. 252/455 R, 208/111, 252/442, 252/455 Z, 252/457, 423/328, 423/331
[51] Int. Cl. ...................... B01j 11/40, C01b 33/20
[58] Field of Search.... 252/455 R, 442, 457, 455 Z; 208/111; 423/328, 331

[56] References Cited
UNITED STATES PATENTS

| | | | |
|---|---|---|---|
| 2,447,181 | 8/1948 | Butterbauch et al. | 252/457 X |
| 2,532,525 | 12/1950 | Webb et al. | 252/457 |
| 2,988,521 | 6/1961 | Innes et al. | 252/457 |
| 3,252,757 | 5/1966 | Granquist | 252/455 R |
| 3,252,889 | 5/1966 | Capell et al. | 252/455 R |
| 3,535,228 | 10/1970 | Csiesery et al. | 252/455 R X |
| 3,535,230 | 10/1970 | Kittrell | 252/455 R X |
| 3,632,502 | 1/1972 | Kittrell | 252/455 R X |
| 3,652,457 | 3/1972 | Jaffe | 252/442 |
| 3,664,972 | 5/1972 | Jaffe | 252/455 R |
| 3,664,973 | 5/1972 | Jaffe | 252/455 R |

Primary Examiner—Daniel E. Wyman
Assistant Examiner—Paul F. Shaver
Attorney, Agent, or Firm—G. F. Magdeburger; R. H. Davies; J. D. Foster

[57] ABSTRACT

A layer-type, dioctahedral, clay-like mineral having the empirical formula $$MgO : sSiO_2 : aAl_2O_3 : bAB : xH_2O$$

wherein the layer-lattice structure is composed of said silica, said alumina, said magnesia, said A and said B, and wherein
$s$ is from 1.4 to 100, preferably $2.0 \leq s \leq 7$,
$a$ is from 0.1 to 100, preferably $0.31 \leq a \leq 6.0$,
$b$ is from 0.2 to 0.6,
A is one equivalent of an exchangeable cation having a valence of 3 or less and is external to the layers of the framework or at the edges or between successive layers of the structure,
B is chosen from the group of negative ions consisting of $F^-$, $OH^-$, $\frac{1}{2}O^{--}$ and mixtures thereof, and is internal or at the edges and surfaces of the layers of the framework structure, and
$x$ is from 2 to 3.5 at 50% relative humidity,
said mineral being characterized by a $d_{001}$ spacing at said humidity within the range which extends from a lower limit of about 10 Angstroms to an upper limit of about 15 Angstroms when A is monovalent and an upper limit of 18 Angstroms when A is divalent or trivalent, with intermediate values possible when A is a mixture of monovalent, divalent and trivalent cations, and a $d_{06}$ spacing at said humidity in the range of from 1.5176 to 1.4977 Angstroms by x-ray diffraction analysis.

The mineral is useful in catalytic cracking processes and may be used as one component of a hydrocracking catalyst.

11 Claims, 4 Drawing Figures

PATENTED OCT 29 1974
3,844,978
FIG.1
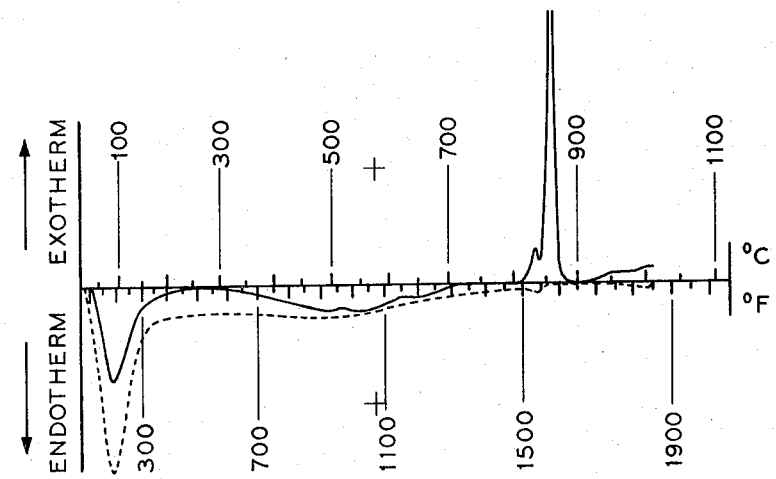
FIG.2
FIG.3
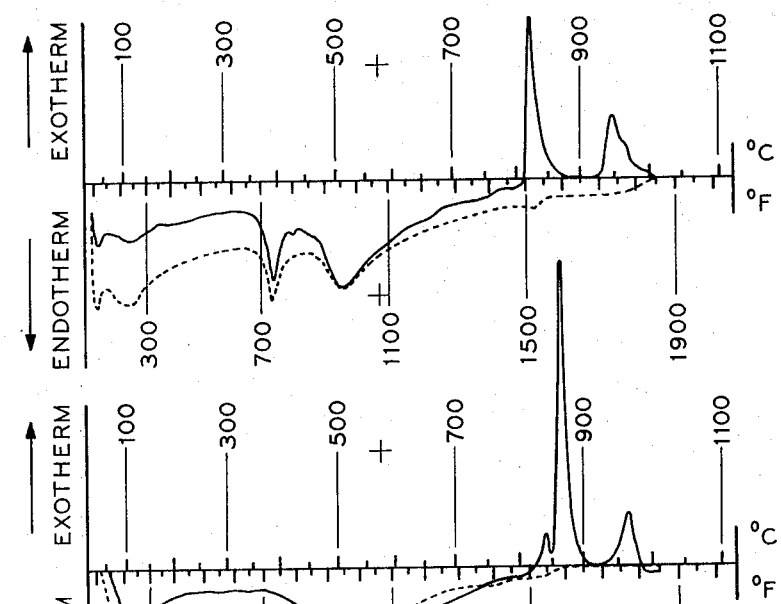
FIG.4
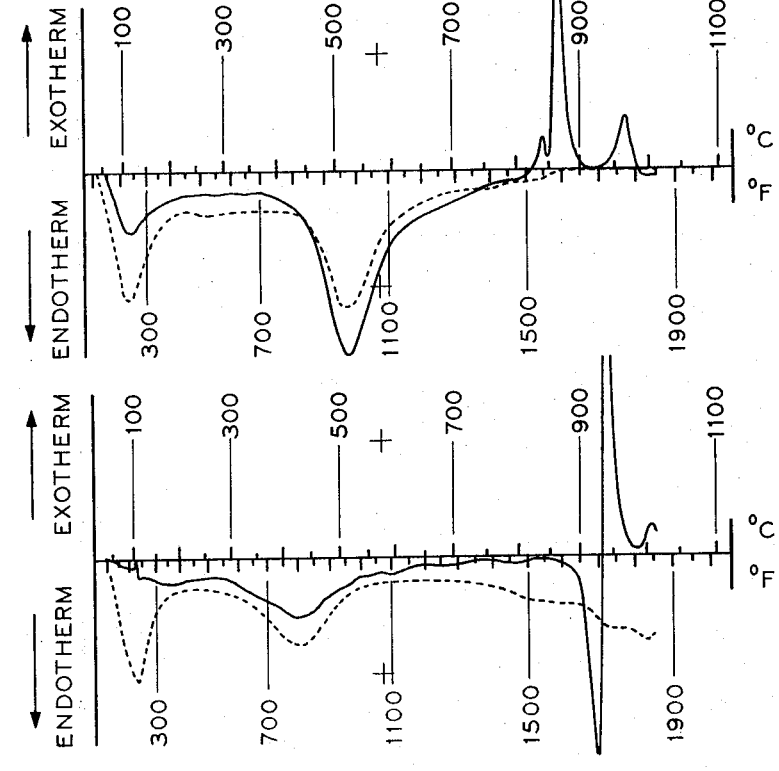

LAYERED CLAY MINERALS AND PROCESSES FOR USING

BACKGROUND OF THE INVENTION

1. Field of the Invention

This invention is directed to a layer-type, dioctahedral, clay-like mineral containing magnesia as a component thereof (sometimes hereinafter referred to as LDCM).

Amorphous cracking catalysts containing magnesia have long been known. They have highly desirable properties, such as high liquid yields and good $C_4$ olefin yields. However, they also have attendant problems which have severely limited their commercial use. They have only marginal thermal sintering stability, poor regenerability, and small pore size.

This invention then is directed to a layered crystalline aluminosilicate mineral containing magnesia within defined limits relative to the alumina and silica and which largely retains the desirable features of the amorphous magnesium oxide cracking catalysts, while significantly reducing the problems associated with the amorphous magnesia-containing cracking catalysts, together with a catalytic process for using the magnesia-containing layered mineral of the present invention.

Additionally, hydroconversion catalysts having as one component of the catalyst the layered mineral of the present invention also form a part of this invention, together with a hydroconversion process using said hydroconversion catalysts.

2. Description of the Prior Art

Considerable research has been directed in recent years to the synthesis of clay minerals.

For example, U.S. Pat. No. 3,252,757 discloses synthetic silicate minerals of the layered type having the empirical formula $$nSiO_2 : Al_2O_3 : mAB : xH_2O$$

where the layer lattices comprise said silica, said alumina, and said B, and where n is from 2.4 to 3.0,
m is from 0.2 to 0.6, A is an exchangeable cation such as $H^+$, $NH_4^+$, $Na^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$, and is external to the lattice, B is chosen from the group of negative ions which consists of $F^-$, $OH^-$, $\frac{1}{2}O^{--}$ and mixtures thereof, and is internal in the lattice, and x is from 2.0 to 3.5 at 50% relative humidity, this component representing total water, interlamellar plus structural, as determined by ignition loss at 1000°C., said mineral being characterized by a $d_{001}$ spacing of at least 10.4 Angstroms but not more than 14.7 Angstroms, determined at 50% relative humidity.

U.S. Pat. No. 3,252,889 discloses synthetic silicate minerals of mixed layered crystal structure with randomly alternating layers of montmorillonite-like and mica-like clay mineral, having the empirical formula $$nSiO_2 : Al_2O_3 : mAB : xH_2O$$

where the layer lattices comprise said silica ($SiO_2$), said alumina ($Al_2O_3$), and said B, and where n is from 2.4 to 3.0,
m is from 0.2 to 0.6, A is one equivalent of an exchangeable cation selected from the group consisting of hydrogen, ammonium, alkali metal and alkaline earth metal ions and mixtures thereof, and is external to the lattice, B is one equivalent of an anion chosen from the group which consists of fluoride, hydroxyl and oxygen ions and mixtures thereof, and is internal in the lattice, and x is from 2.0 to 3.5 at 50% relative humidity, this component representing total water, interlamellar plus structural, as determined by ignition loss at 1000°C., said mineral being further characterized by a $d_{001}$ spacing of at least 10.4 Angstrom units but not more than 14.7 Angstrom units, determined at 50% relative humidity.

U.S. Pat. No. 3,586,478 discloses a method for producing synthetic swelling clays of the hectorite type by forming an aqueous slurry from a water-soluble magnesium salt, sodium silicate, sodium carbonate or sodium hydroxide, and material delivering lithium and fluoride ions to the slurry. This aqueous slurry is hydrothermally treated to crystallize the synthetic mineral-like clay. A clay-like mineral is stated to be provided by the invention, having the structural formula.

$$(Si_8Mg_{6-x}Li_x.O_{20}.[OH]_{4-y}F_y)^{x(-),(x/n)}M^{n(+)}$$

in which x is between zero and six, y is from 1 up to but excluding 4, M is a cation. Suitably y is at least 1.5.

U.S. Pat. No. 3,666,407 teaches a process for producing synthetic hectorite clays having rheological properties similar to those of natural hectorite, which has the formula $$[Si_8Mg_{5.34}Li_{0.66}(OH)_4O_{20}]^{0.66}$$

wherein F may replace some of the OH substituent.

U.S. Pat. No. 3,671,190 teaches a process for preparing a synthetic clay-like mineral of the smectite type, having the general structural formula $$[Si_8Mg_aLi_bH_{4+c}O_{24}]^{(12-2a-b-c)-}\cdot M(12-2a-b-c)+$$

and having M as a sodium, a lithium or an equivalent of an organic cation.

Amorphous catalysts containing magnesia are well known. Exemplary prior art includes U.S. Pat. Nos. 2,988,521, 2,447,181 and 2,532,525.

SUMMARY OF THE INVENTION

The present invention is directed to a layer-type, dioctahedral, clay-like mineral (LDCM) having the empirical formula $$MgO : sSiO_2 : aAl_2O_3 : bAB : xH_2O$$

wherein the layer-lattice structure is composed of said silica, said alumina, said magnesia, said A and said B, and wherein s is from 1.4 to 100, preferably $2.0 \leq s \leq 7$,
a is from 0.1 to 100, preferably $0.31 \leq a \leq 6.0$,
b is from 0.2 to 0.6, wherein s, a and b are expressed as molar ratios, A is one equivalent of an exchangeable cation having a valence of 3 or less and is external to the layers of the framework or at the edges or between successive layers of the structure, B is chosen from the group of negative ions consisting of $F^-$, $OH^-$, $\frac{1}{2}O^{--}$ and mixtures thereof, and is internal or at the edges and surfaces of the layers of the framework structure, and x is from 2 to 3.5 at 50% relative humidity, said mineral being characterized by a $d_{001}$ spacing at said humidity within the range which extends from a lower limit of about 10 Angstroms to an upper limit of about 15 Angstroms when A is monovalent and an upper limit of 18 Angstroms when A is divalent or trivalent, with intermediate values possible when A is a mixture of monovalent, divalent and trivalent cations, and a $d_{06}$ spacing at said humidity in the range of from 1.5176 to 1.4977 Angstroms by x-ray diffraction analysis.

Also encompassed in the present invention is a precursor composition from which the clay-like mineral described above can be prepared, comprising:
1. water;
2. silica, alumina and magnesia; and
3. a cation such as ammonium, sodium, potassium, magnesium, barium, strontium, aluminum, or any monovalent, divalent or trivalent cation, together with an anion such as hydroxyl, fluoride, acetate or chloride.

Also included within the present invention are hydroconversion catalysts encompassing the clay-like mineral having the empirical formula set forth above which has been combined with one or more catalytically active metals or compounds thereof. Particularly useful metal components are metals or oxides, sulfides, chlorides, or the like, of Group VI-B and Group VIII metals, particularly platinum, palladium, cobalt, nickel, molybdenum, and tungsten.

A hydroconversion process using the hydroconversion catalyst described above also forms part of this invention.

Additionally, a catalytic cracking catalyst comprising the dehydrated form of LDCM, either alone or in combination with other cracking catalyst components such as zeolitic components and/or amorphous silica-alumina, etc., forms a part of this invention.

A catalytic cracking process using the catalytic cracking catalyst described above is also encompassed within this invention.

BRIEF DESCRIPTION OF THE DRAWINGS

FIGS. 1–3 are thermal analyses of some typical commercial cracking catalysts. FIG. 4 is a thermal analysis of LDCM prepared by the process of the present invention.

DETAILED DESCRIPTION OF THE INVENTION, INCLUDING PREFERRED EMBODIMENTS

The present invention is directed to a layer-type, dioctahedral, clay-like mineral (LDCM) having the empirical formula

MgO : $s$SiO$_2$ : $a$Al$_2$O$_3$ : $b$AB : $x$H$_2$O wherein the nomenclature and proportions are as defined above under "Summary of the Invention."

Also encompassed in the present invention are precursor compositions (all parts by weight) from which the clay-like mineral described above can be prepared, comprising:
1. from about 70 to about 95% water, based on (1) and (2);
2. from about 30 to about 5% (combined weight percent) of silica, alumina and magnesia, based on (1) and (2), such that the respective molar ratios of the silica and alumina with regard to the magnesia are $1.4 \leq s \leq 100$
$0.1 \leq a \leq 100$ (That is, there are 1.4 to 100 moles of silica per mole of magnesia, and 0.1 to 100 moles of alumina per mole of magnesia.) and
3. a cation such as ammonium, sodium, potassium, magnesium, barium, strontium, aluminum, or any monovalent, divalent or trivalent cation, together with an anion such as hydroxyl, fluoride, acetate or chloride, in sufficient quantity that the pH of the mixture is in the range of from 7.0 to about 10.5, preferably 9.0 to 10.5.

Also forming part of the present invention are hydroconversion catalysts containing LDCM and at least one additional catalytically active metal, either in the metallic state or in the oxide, sulfide, chloride, etc., state.

LDCM is also useful as such as a catalytic cracking catalyst, or may be combined with other components such as a siliceous gel, zeolites, and the like, to form a composite catalyst for catalytic cracking.

Method of Preparation

LDCM is preferably prepared by hydrothermal crystallization from aqueous slurries of a mixture of hydrous silica, hydrous alumina, hydrous magnesia and fluoride of appropriate composition. After formation of the aqueous slurry, it is preferably blended until homogeneous and then aged. The pH is adjusted to the desired range of from about 7.0 to about 10.5, and the slurry is then heated to a temperature of from 550° to 700°F., preferably 590° to 650°F., preferably under autogenous pressure and preferably with stirring, for a period of time of from about one-half hour to about 4 hours, preferably from about three-quarters hour to about 2 hours. Increased hydrothermal treatment times result in products having reduced surface area and, consequently, reduced catalytic activity.

After the hydrothermal crystallization is completed, the resulting slurry is allowed to cool, evaporated to dewater the slurry, and is then dried, preferably under vacuum. After drying is completed, the product is then ground to the desired size.

Hydroconversion Catalysts

When the layered mineral (LDCM) of the present invention is used as one component of a hydroconversion catalyst, the catalysts containing the LDCM can be of widely varying composition. At least one catalytically active metal or stable inorganic compound thereof is combined with LDCM. LDCM becomes dehydrated during drying and calcination of the catalyst composite. Alternatively, LDCM can be dehydrated prior to compositing with the other component(s) of the hydroconversion catalyst. LDCM and the catalytically active metal or stable inorganic compound thereof may form part of a matrix comprised of a siliceous gel, may be combined with zeolitic components, and the like. Preferably when the catalyst includes a matrix comprising a siliceous gel such as a silica-alumina gel, it will be further characterized by an average pore diameter below 100 Angstroms and a surface area above 200 m$^2$/gram. By "hydroconversion" is meant hydrocracking, hydrofining, hydrogenation and dehydrogenation processes.

When the catalyst includes a matrix comprising a silica-alumina gel, the catalyst may advantageously comprise titanium, zirconium, thorium, or hafnium, or any combination thereof, in the form of metals, oxides, sulfides, or any combination thereof, in an amount of 1 to 10 weight percent, preferably 5 to 9 weight percent, of said matrix, calculated as metal. Titanium, preferably in the form of titania, is preferred.

The catalytically active metal component may be selected from Group VI-B or Group VIII, or may be comprised of mixtures from both Group VI-B and Group VIII, as well as being combined with promoters from Group IV. The Group VIII component may be, for example, nickel, cobalt, platinum or palladium, in the form of the metal, oxide, sulfide, or any combination thereof. When the catalyst does not include a matrix comprising a silica-alumina gel, the Group VIII component may be present in the catalyst in an amount of from 0.4 to 15 weight percent, calculated as metal, and based on the LDCM component.

The Group VI-B component, when present either by itself or in combination with a Group VIII component, may comprise tungsten, molybdenum, and/or chromium.

When the catalyst includes a matrix comprising a silica-alumina gel, a Group VI-B component may be present in the catalyst in an amount of from 0.01 to 15 weight percent, preferably 0.01 to 10 weight percent, calculated as metal and based on the matrix. When the catalyst comprises a mixture of Group VI-B and Group VIII components such as nickel or cobalt with molybdenum or tungsten, the combined weight of the Group VI-B and Group VIII components, calculated as metal and based on the matrix, will generally be in the range of from 5 to 20 weight percent. When platinum or palladium or compounds thereof are used in the hydroconversion catalyst discussed herein, the amounts thereof will generally be less than when nickel or cobalt or compounds thereof are used.

The hydroconversion catalyst discussed herein may advantageously contain a Group IV-A component, i.e., tin, germanium, or lead, or compounds thereof, as promoters, particularly when the catalyst also contains nickel or a compound thereof, regardless of whether the catalyst includes a matrix comprising a silica-alumina gel. The Group IV-A component may be present in an amount of 0.5 to 30 weight percent, preferably 2 to 15 weight percent, based on the catalyst and calculated as metal, when the catalyst includes a matrix comprising a silica-alumina gel. When the catalyst does not include a matrix comprising a silica-alumina gel, a Group IV-A metal or compound thereof may be present in an amount of 0.2 to 15 weight percent, based on the catalyst and calculated as metal. When the hydroconversion catalyst includes a matrix comprising a silica-alumina gel, the LDCM will generally be present in an amount of from 1 to 60 weight percent of the catalyst.

The hydroconversion catalysts of the present invention can be prepared by conventional techniques well known in the art. For example, the hydrogenating component can be added by well-known impregnation techniques, by precipitation onto the LDCM, by ion exchange, and the like. See U.S. Pat. No. 3,535,228.

The LDCM component becomes dehydrated during drying and calcining of the catalyst, and it is this dehydrated form of the LDCM which constitutes a part of the hydroconversion catalyst.

Calcination of the hydroconversion catalysts will be carried out at a temperature in the range of from about 800° to 1400°F., preferably 900° to 1100°F., although temperatures as high as 1600°F. can be used.

The hydroconversion process of the present invention using the hydroconversion catalysts disclosed herein will be carried out using conventional hydroconversion conditions. These include for hydrocracking, hydrofining and hydrogenation a temperature in the range 400° to 950°F., preferably 500° to 850°F., a pressure in the range 800 to 3500 psig, preferably 1000 to 3000 psig, a liquid hourly space velocity in the range 0.1 to 5.0, preferably 0.5 to 5.0, and more preferably 0.5 to 3.0. The total hydrogen supply rate (makeup and recycle hydrogen) will be 200 to 20,000 SCF, preferably 2000 to 20,000 SCF, of hydrogen per barrel of feedstock. For dehydrogenation, temperatures of from 900° to 950°F. are preferably used, together with low pressures in the range of 100 to 200 psig.

Catalytic Cracking Catalysts

When the layered clay-like minerals having the empirical formula set forth above are utilized as catalytic cracking catalysts either alone or in combination with zeolites and/or amorphous inorganic oxide components such as silica, alumina, silica-alumina, and silica-alumina-magnesia, said layered clay-like minerals are dehydrated and calcined, and these forms of the dehydrated materials constitute the cracking catalysts of the present invention.

Dehydration of the LDCM of the present invention can be most easily accomplished by calcination. Such calcination is carried out at a temperature in the range of from 800° to 1400°F., although higher temperatures of up to about 1600°F. can also be employed. Preferably a temperature in the range of from 900° to 1100°F. is used. The calcination may be effected under vacuum or with the use of an inert purge gas such as nitrogen or with the use of a purge gas such as air. Alternatively, the hydrated LDCM of the present invention can be employed directly in high-temperature cracking processes without prior dehydration, with the dehydration occurring in situ. However, it is preferred that dehydration be carried out prior to the initiation of the cracking process.

The composite catalytic cracking catalysts of this invention which utilize LDCM may be provided by a variety of procedures and utilize a variety of components. U.S. Pat. No. 3,140,253, at Cols. 9 and 10, describes the combination of zeolites with a variety of porous matrix materials, including clays. In a similar manner, LDCM may be combined, dispersed or otherwise intimately admixed with zeolites and/or porous matrix materials such as clays, amorphous inorganic oxide components, and the like.

A particularly preferred mineral composition of this invention for use as catalytic cracking catalyst or as one component thereof is the mineral composition of the formula

$$MgO : sSiO_2 : aAl_2O_3 : bAB : xH_2O$$

wherein the nomenclature and proportions are as generally defined above under "Summary of the Invention," but with A limited to cations which upon calcination give a product in the hydrogen form and wherein B may be at least in part fluoride (present in sufficient amount to give a weight percent fluoride after calcination of 1 to 3%, preferably 2%).

Catalytic cracking processes of the present invention are carried out under conditions which are known in the art. Generally, the temperature will be in the range of from 600° to 1100°F., preferably in the range of from 800° to 975°F., more preferably from about 900° to 950°F. The pressure will be in the range of from about 1 to 200 psig, preferably 10 to 30 psig, and the liquid hourly space velocity ranging from 0.5 to 100 or even higher, at a conversion rate from 40 to 85%.

Hydrocarbon feedstocks fed to the catalytic cracking zone will in general have boiling ranges above about 400°F., for example gas oils, cycle stocks, naphthas and the usual charge stocks, particularly those used for producing gasoline.

Hydroconversion Feedstocks

When the layered clay-like mineral is used as one of the components of a hydroconversion composite catalyst, the feedstocks supplied to the hydroconversion zone may be selected from a broad class of feedstocks. These include petroleum distillates, solvent-deasphalted petroleum residua, shale oils and coal tar distillates. The feedstocks contain substantial amounts of materials boiling above 200°F., preferably substantial amounts of materials boiling in the range 350° to 950°F., and more preferably in the range 400° to 900°F. Suitable feedstocks include those heavy distillates normally defined as heavy straight-run gas oils and heavy cracked cycle oils, as well as conventional FCC feed and portions thereof. Cracked stocks may be obtained from thermal catalytic cracking of various stocks, including those obtained from petroleum gilsonite and shale and coal tar.

While the process of the present invention can be practiced when supplying to the hydroconversion zone hydrocarbon feeds containing relatively large quantities of organic nitrogen and sulfur, it is preferred that theorganic nitrogen content be less than 1000 ppm. The preferred range is 0.5 to 1000 ppm., more preferably 0.5 to 100 ppm. The sulfur content of the feedstock should also preferably be maintained at a relatively low level of from 0 to 3 weight percent preferably 0 to 1 weight percent.

DETAILED DESCRIPTION OF THE DRAWINGS

The drawings in the present invention show the improved thermal stability of LDCM with reduced tendency to sinter, as compared to some typical amorphous commercial cracking catalysts containing magnesia.

Effluent gas analysis (EGA) and differential thermal analysis (DTA) were used in studying structural transformation of the catalysts. The dotted curves in FIGS. 1–4 represent a change in composition of the effluent gas from the injected gas fed to the sample as measured by a thermal conductivity detector. It is a measure of gases released from the catalyst as the temperature of the sample is increased. The solid curves in FIGS. 1–4 are representative of the heat evolved or absorbed by the catalyst samples as thermochemical transformations occur in the catalyst samples. When the solid curve is above the base line, it is indicative of heat being evolved (exothermic) by the sample. When the solid curve is below the base line, it is indicative of heat being absorbed (endothermic) by the sample.

FIG. 1 is the thermal analysis of a commercial silica-magnesia cracking catalyst having a bulk density of 0.54 g/cc., a surface area of 802 m²/g., and a pore volume of 0.60 ml/g. As can be seen from FIG. 1, structural transformation (crystallization) began at about 800°C. and was substantially complete at about 900°C. The catalyst after reaching 900°C. has substantially no catalytic activity.

FIG. 2 is the thermal analysis of a commercial silica-magnesia cracking catalyst having a bulk density of 0.69 g/cc. and a surface area of 228 m²/g. after 6 hours at 1400°F., 1 atmosphere steam. As can be seen from FIG. 2, structural transformation (crystallization) began at about 800°C. and was substantially complete at about 900°C. The catalyst after reaching 900°C. has substantially no catalytic activity.

FIG. 3 is the thermal analysis of a commercial silica-magnesia cracking catalyst having a bulk density of 0.89 g/cc. As can be seen from FIG. 3, structural transformation (crystallization) began at about 800°C. and was substantially complete at about 900°C. The catalyst after reaching 900°C. has substantially no catalytic activity.

FIG. 4 is the thermal analysis of a synthetic LDCM catalyst calcined in air at 1400°F. for 6 hours, with a bulk density of 0.7 g/cc. and a surface area of 203 m²/g. As can be seen from FIG. 4, structural transformation (crystallization) began at about 850°C. and was substantially complete at 975°C. The catalyst after reaching 975°C. has substantially no catalytic activity.

The improved thermal stability of the LDCM is apparent from a consideration of these four figures.

EXAMPLES

The present invention will be better understood with reference to the following examples, which are offered by way of illustration and not by way of limitation.

EXAMPLE 1

A slurry of 47.2 grams of aluminum trihydrate powder dispersed in an aqueous solution of 85.6 grams of magnesium acetate tetrahydrate dissolved in 582 cc. of distilled water was blended in a colloid mill until homogeneous. To this slurry was added a solution of 6.0 grams of ammonium fluoride and 91.9 cc. ammonium hydroxide (30% $NH_3$) dissolved in 1000 cc. of distilled water. The slurry was blended until homogeneous and allowed to age overnight at 100°F. To the aged slurry was added 276 grams of an aqueous silica sol (30.1 wt.% $SiO_2$), stirring until homogeneous. The pH was adjusted to 10.3 with concentrated ammonium hydroxide solution. The homogeneous slurry was transferred quantitatively to a stainless steel one-gallon autoclave fitted with a paddle stirrer and cooling coil. The slurry was heated to 592°F. and held at this temperature for 4 hours at 1453 psig while stirring at 200 RPM before quench-cooling the slurry. The product slurry pH was 9.1. The slurry was poured onto stainless steel trays and evaporated to dryness at 150°F. in a circulating air oven. The evaporate obtained was further dried overnight (16 hours) at 195°F. at 20" vacuum (mercury) with a slow-dry nitrogen purge. The product yield was 127 grams. The evaporate was ground to pass 100-mesh sieve, redried overnight at 195°F. in 20 inch partial vacuum (mercury) under nitrogen, and stored.

X-ray analysis of this material indicated a clay structure of the montmorillonite type. The hk reflection corresponding to $d_{06}$ reflection gave $d = 1.504 A (61.6°2\theta)$.

The composition of the synthetic clay product was:

|  | Calculated (Wt.%) | Found (Wt.%) |
|---|---|---|
| MgO | 12.0 | 12.7 |
| $Al_2O_3$ | 22.9 | 23.6 |
| $SiO_2$ | 63.0 | 62.0 |
| F | 2.0 | 2.1 |

Loss on ignition was found to be 9.85 weight percent after calcination in air for 5 hours at 950°F. The surface area of the calcined product was 246 m²/g., and the pore volume by dodecane porosimetry was 0.374 cc/g.

EXAMPLE 2

A slurry consisting of 47.2 grams of aluminum trihydrate powder dispersed in an aqueous solution consisting of 85.6 grams of magnesium acetate tetrahydrate dissolved in 582 cc. of distilled water was prepared using a colloid mill. A solution of 6.0 grams ammonium fluoride and 91.9 cc. concentrated ammonium hydroxide (30% $NH_3$) dissolved in 1000 cc. of distilled water was added to the slurry with stirring. The alumina slurry was allowed to age for 7 hours at 92°F. To the aged slurry was added 276 grams of a colloidal silica sol (30.1 wt.% $SiO_2$) and an additional 100 cc. of concentrated ammonium hydroxide solution to raise the final pH of the slurry to 9.9. The slurry was transferred to a stainless steel 1-gallon autoclave, sealed, and heated from ambient temperature and pressure to 592°F. and 1453 psig in 95 minutes, while stirring at 200 RPM. When the temperature reached 592°F., the power was cut off from the heaters and the slurry cooled to ambient temperature in 30 minutes. The slurry was transferred to stainless steel trays and evaporated to dryness at 150°F. in a circulating air oven. The dried cake was further dried overnight (16 hours) at 195°F. at 20 inch vacuum (mercury) with a slow nitrogen purge. The yield of dried product was 140 grams. The dried cake was crushed and ground to pass 100-mesh screen and then passed through a pulverizer (micronizer). The product was dried overnight (16 hours) at 195°F. at 20 inch vacuum (mercury) with a slow nitrogen purge. The volatiles content of this product was 11.62%. After calcination in air for 4 hours at 400°F., followed by 5 hours at 950°F. the BET nitrogen surface area was found to be 412 m²/gram and the dodecane pore volume was 0.428 cc/g. The skeletal density was found to be 2.50 by helium displacement. X-ray diffraction analysis indicated a slight clay pattern with $d_{06}$ reflection at 1.5176 Angstroms (61 °2θ).

EXAMPLE 3

The procedures of Example 2 were followed. In this example, the slurry temperature was maintained for 1 ¼ hours at 592°F. and 1453 psig before quenching and cooling. The finished product had a volatiles content of 10.69 weight percent. The BET nitrogen surface area of the calcined product was found to be 333 m²/g. and the dodecane pore volume was 2.157 cc/g. The skeletal density of the product was 2.666 g/cc.

EXAMPLE 4

The procedures of Example 2 were followed. In this example the slurry temperature was maintained for 1 hour at 592°F. and 1453 psig before quenching and cooling to ambient temperature. The finished product had a volatiles content of 19.51 weight percent. The BET nitrogen surface area of the calcined product was 321 m²/g. and the dodecane pore volume was 2.616 cc/g. The skeletal density was 2.236 g/cc.

EXAMPLE 5

The procedures of Example 2 were followed. In this example the slurry was maintained at 592°F. and 1453 psig for four hours before quenching and cooling the slurry. The finished product had a volatiles content of 9.85%. The BET nitrogen surface area after calcination was 246 m²/g. and the dodecane pore volume was 0.374 cc/g. The skeletal density was 2.929 g/cc.

EXAMPLE 6

A sample of synthetic montmorillonite clay, prepared according to the process of the present invention and having the composition, expressed in weight percent oxides on an ignition basis:

12.7% MgO, 23.6% $Al_2O_3$, 62.0% $SiO_2$, 2.1% F, and with a surface area of 246 m²/g., was impregnated with water using an immiscible solvent displacement technique described by Tauser, *J. catalysis* 18,358 (1970). The dried clay powder, having a clay structure of the montmorillonite type, was dispersed in n-heptane using a homogenizer. A volume of water corresponding to 0.7 cc. $H_2O$/gram clay was slowly titrated into the heptaneclay dispersion. A light but pasty mass resulted. Heptane was removed by filtration and the residual mass extruded through a 1/16 inch die. The extruded mass was dried overnight at 194°F. at 20 inch vacuum (mercury) with a slow nitrogen purge to remove excess heptane, then calcined 4 hours at 400°F. in air and 5 hours at 950°F. in air to obtain a strong catalyst extrudate. The calcined extrudate was crushed to pass 24-mesh and divided into 4 parts. The parts were given additional treatment as indicated:

Part 1 — no further treatment
Part 2 — air calcined for 6 hours at 1400°F.
Part 3 — steam treated for 6 hours at 1400°F. in 100% steam
Part 4 — air calcined for 6 hours at 1600°F.

The surface areas of the catalysts and the catalytic activities were measured after each treatment. Results are given below:

| Sample | Surface Area, m²/gm | Conversion |
|---|---|---|
| 1 | 240 | 86.2 |
| 2 | 193 | 75.6 |
| 3 | 148 | 65.8 |
| 4 | 94 | 60.1 |

Sample 3 shows that the catalyst of the present invention has good stability after steaming. This is critical to effective performance in a catalytic cracker, since high-temperature steam is continuously contacting the catalyst in the catalytic cracking system. Amorphous magnesia-containing catalytic cracking catalysts have very poor stability, rendering them undesirable for commercial catalytic cracking.

Sample 4 shows the thermal stability of this type of catalyst.

EXAMPLE 7

A sample of synthetic clay, prepared according to the procedure of the present invention and having a clay structure of the montmorillonite type, and having the composition expressed as weight percent oxides on an ignited basis:

12.7% MgO, 23.6% $Al_2O_3$, 62.0% $SiO_2$, 2.1% F, with a surface area of 343 m²/g., was impregnated with an aqueous solution of palladium tetraammine dinitrate instead of distilled water to give a final metals loading of 0.548 weight percent Pd, using the immiscible solvent displacement technique at 0.7 cc. solution/gram clay. The impregnated clay was extruded, dried and calcined (4 hours at 400°F. in air and 5 hours at 950°F. in air) as in Example 6. The surface area of the final extruded palladium-loaded clay was 336 m²/g., with a dodecane pore volume of 0.507 cc/g. The average bulk density of the 24–42 mesh particles was 0.64 g/cc.

EXAMPLE 8

The catalyst of Example 7 was evaluated for hydrocracking using a denitrified Mid-Continent gas oil which had the following inspections:

| | |
|---|---|
| API | 33.3 |
| Aniline Point, °F. | 177.6 |
| Nitrogen, ppm. | 0.2 |
| PNA, Mass Spec. | 16.5 |
| | 68.7 |
| | 14.8 |
| D-1160 Distillation, °F. | |
| 10/50/90%, Atmos. Pres. | 515/666/762 |

Test conditions were: extinction recycle below 400°F. recycle cut point, 60% per-pass conversion, 1300 psig total pressure, and 5600 SCF/bbl. recycle gas rate.

The results are compared to the results of two prior art catalysts in Table I. Catalyst I is sulfided nickel on a silica-alumina base; Catalyst II is palladium on a silica-alumina base. The catalyst of this invention produces much less of the low-value $C_4^-$ products and over 4 liquid volume percent more of the valuable $C_5+$ products compared with Catalyst I, but has a lower light gasoline octane number. The new catalyst produces slightly less of the $C_4^-$ and more $C_5+$ products than Catalyst II, and has a higher light gasoline octane number than Catalyst II. The new catalyst is more active than either of the prior are catalysts.

TABLE I

| | Catalyst of Example 7 | Catalyst I | Catalyst II |
|---|---|---|---|
| Yields, LV% | | | |
| $C_3^-$ | 1.7 | 3.4 | 2.9 |
| $iC_4$ | 10.7 | 14.5 | 10.5 |
| $nC_4$ | 2.0 | 3.3 | 2.8 |
| $C_5-180°F.$ | 21.8 | 26.4 | 23.7 |
| $180°-400°F.$ | 84.6 | 75.7 | 82.2 |
| $C_5+$ LV% | 106.4 | 102.1 | 105.9 |
| F-1 clear octane $C_5-180°F.$ cut | 83.0 | 85.6 | 81.1 |
| LHSV | 2.0 | 4.0 | 4.0 |
| To, °F. | 548 | 590 | 623 |
| To at 2.0 LHSV | 548 | 562* | 595* |

*Estimated
"To" is initial temperature obtained by extrapolating "lined out" temperature back to zero time.

EXAMPLE 9

The catalyst of Example 6 (Sample 3) was tested for catalytic cracking ability using the procedure outlined below.

A 625–900°F. gas oil cut prepared by distillation from a Pascagoula gas oil of wider boiling range and having a feed gravity of 24.1°API was contacted with the catalyst. The reaction was carried out at a temperature of 925°F., at substantially atmospheric pressure, and at a weight hourly space velocity of 3.72. The catalyst had a particle size range from 28 to 60 mesh. The catalyst/oil ratio was 3.23:1.

The product had the distribution set forth in Table II below. A total conversion rate of 65.6% was obtained.

TABLE II

| | Product Yields, Wt.% | |
|---|---|---|
| Coke | | 6.20 |
| $H_2$ | 0.28 | |
| $C_1$ | 0.59 | |
| * $C_2 + C_2^=$ | 1.67 | |
| ** $C_2^-$ gas | | 2.54 |
| $C_3$ | 1.08 | |
| * $C_3^=$ | 4.04 | |
| Total $C_3$'s | | 5.12 |
| $iC_4$ | 3.16 | |
| $nC_4$ | 0.76 | |
| * $C_4^=$ | 5.02 | |
| Total $C_4$'s | | 8.94 |
| $C_5-430°F.$ gasoline | | 42.76 |
| 430–625°F. light cycle oil | | 20.94 |

*The symbols $C_2^=$, $C_3^=$ and $C_4^=$ mean unsaturated hydrocarbons having two, three and four carbon atoms respectively, e.g., ethylene, propylene and 1-butene.
**The symbol $C_2^-$ means materials produced having two carbon atoms or less, plus $H_2$.

As can be seen from Table I, the catalyst produced a high level of $C_5-430°F.$ material. The $C_3$, $C_2^-$ and coke represented only about 21% of the converted material.

It is apparent that many widely different embodiments of this invention may be made without departing from the scope and spirit thereof; and, therefore, it is not intended to be limited except as indicated in the appended claims.

What is claimed is:

1. A layer-type, dioctahedral, clay-like mineral having the empirical formula $$MgO : sSiO_2 : aAl_2O_3 : bAB : xH_2O$$

wherein the layer-lattice structure is composed of said silica, said alumina, said magnesia, said A and said B, and wherein s is from 1.4 to 100,
a is from 0.1 to 100,
b is from 0.2 to 0.6,
A is one equivalent of an exchangeable cation having a valence of 3 or less and is external to the layers of the framework or at the edges or between successive layers of the structure,
B is chosen from the group of negative ions consisting of $F^-$, $OH^-$, $½O^{--}$ and mixtures thereof, and is internal or at the edges and surfaces of the layers of the framework structure, and
x is from 2 to 3.5 at 50% relative humidity, said mineral being characterized by a $d_{001}$ spacing at said humidity within the range which extends from a lower limit of about 10 Angstroms to an upper limit of about 15 Angstroms when A is monovalent and an upper limit of 18 Angstroms when A is divalent or trivalent, with intermediate values possible when A is a mixture of monovalent, divalent and trivalent cations, and a $d_{06}$ spacing at said humidity in the range of from 1.5176 to 1.4977 Angstroms by x-ray diffraction analysis.

2. The mineral of claim 1 where $2.0 \leq s \leq 7$ and $0.31 \leq a \leq 6.0$, A is $NH_4^+$ and B is a mixture of $F^-$ and $OH^-$.

3. A mineral in accordance with claim 1 wherein A is chosen from the group consisting of $H^+$, $NH_4^+$, $Na^+$, $K^+$, ½ $Mg^{++}$, ½ $Ba^{++}$, ½ $Sr^{++}$, and ⅓ $Al^{+++}$, and mixtures thereof.

4. The mineral of claim 1 wherein A is a cation that may be readily converted into the hydrogen form upon calcination.

5. The mineral of claim 1 wherein A is $NH_4^+$, B is at least in part $F^-$, and calcination gives a product consisting essentially of the product of claim 1 in the hydrogen form, wherein $s = 3.28$, $a = 0.74$, and said mineral having after calcination a fluoride content of from 1 to 3 weight percent.

6. A catalytic cracking catalyst comprising dehydrated, calcined, layer-type, dioctahedral, clay-like mineral having prior to dehydration and calcining of said catalyst the empirical formula $$MgO : sSiO_2 : aAl_2O_3 : bAB : xH_2O$$

wherein the layer-lattice structure is composed of said silica, said alumina, said magnesia, said A and said B, and wherein $s$ is from 1.4 to 100,
$a$ is from 0.1 to 100,
$b$ is from 0.2 to 0.6,
A is one equivalent of an exchangeable cation having a valence of 3 or less and is external to the layers of the framework or at the edges or between successive layers of the structure,
B is chosen from the group of negative ions consisting of $F^-$, $OH^-$, ½ $O^{--}$ and mixtures thereof, and is internal or at the edges and surfaces of the layers of the framework structure, and
$x$ is from 2 to 3.5 at 50% relative humidity, said mineral being characterized by a $d_{001}$ spacing at said humidity within the range which extends from a lower limit of about 10 Angstroms to an upper limit of about 15 Angstroms when A is monovalent and an upper limit of 18 Angstroms when A is divalent or trivalent, with intermediate values possible when A is a mixture of monovalent, divalent and trivalent cations, and a $d_{06}$ spacing at said humidity in the range of from 1.5176 to 1.4977 Angstroms by x-ray diffraction analysis.

7. The catalytic cracking catalyst of claim 6 wherein said dehydrated mineral is composited with an amorphous inorganic oxide.

8. The catalytic cracking catalyst of claim 6 wherein said dehydrated mineral is composited with a zeolite.

9. A catalyst composite comprising:
A. a layer-type, dioctahedral, clay-like mineral having prior to dehydration and calcining of said catalyst the empirical formula $$MgO : sSiO_2 : aAl_2O_3 : bAB : xH_2O$$

wherein the layer-lattice structure is composed of said silica, said alumina, said magnesia, said A and said B, and wherein $s$ is from 1.4 to 100,
$a$ is from 0.1 to 100,
$b$ is from 0.2 to 0.6,
A is one equivalent of an exchangeable cation having a valence of 3 or less and is external to the layers of the framework or at the edges or between successive layers of the structure,
B is chosen from the group of negative ions consisting of $F^-$, $OH^-$, ½ $O^{--}$ and mixtures thereof, and is internal or at the edges and surfaces of the layers of the framework structure, and
$x$ is from 2 to 3.5 at 50% relative humidity, said mineral being characterized by a $d_{001}$ spacing at said humidity within the range which extends from a lower limit of about 10 Angstroms to an upper limit of about 15 Angstroms when A is monovalent and an upper limit of 18 Angstroms when A is divalent or trivalent, with intermediate values possible when A is a mixture of monovalent, divalent and trivalent cations, and a $d_{06}$ spacing at said humidity in the range of from 1.5176 to 1.4977 Angstroms by x-ray diffraction analysis; and B. at least one hydrogenation component.

10. The catalyst of claim 9 wherein said hydrogenation component is a Group VIB or Group VIII metal, oxide, sulfide, or any combination thereof.

11. The catalyst of claim 10 wherein said hydrogenation component is palladium.

* * * * *